US011396859B2

(12) United States Patent
Higinbotham

(10) Patent No.: US 11,396,859 B2
(45) Date of Patent: Jul. 26, 2022

(54) TURBINE BLADE ASSEMBLY

(71) Applicant: Michael Alden Higinbotham, Middle Point, OH (US)

(72) Inventor: Michael Alden Higinbotham, Middle Point, OH (US)

(*) Notice: Subject to any disclaimer, the term of this patent is extended or adjusted under 35 U.S.C. 154(b) by 0 days.

(21) Appl. No.: 17/332,291

(22) Filed: May 27, 2021

(65) Prior Publication Data
US 2021/0285416 A1 Sep. 16, 2021

Related U.S. Application Data

(63) Continuation of application No. 16/208,553, filed on Dec. 3, 2018, now abandoned.

(60) Provisional application No. 62/593,404, filed on Dec. 1, 2017.

(51) Int. Cl.
F03D 1/06 (2006.01)

(52) U.S. Cl.
CPC ........ F03D 1/0625 (2013.01); *F05B 2250/71* (2013.01)

(58) Field of Classification Search
CPC .... F03D 1/0625; F03D 1/0633; F03D 1/0608; F03D 1/06; F05B 2250/611; Y02E 10/72
See application file for complete search history.

(56) References Cited

U.S. PATENT DOCUMENTS

| | | | | |
|---|---|---|---|---|
| 547,210 A | * | 10/1895 | Name not available | A47J 43/0711 416/227 R |
| 3,504,990 A | * | 4/1970 | Sugden | B63H 1/16 416/176 |
| 4,445,817 A | * | 5/1984 | Wethern | B64C 11/00 416/212 R |
| 5,890,875 A | * | 4/1999 | Silvano | A63H 33/40 366/342 |
| 6,099,256 A | * | 8/2000 | Silvano | F04D 29/325 29/889.6 |
| 6,524,073 B2 | * | 2/2003 | Mnatsakanian | A47G 33/0809 416/223 R |
| 6,736,600 B1 | * | 5/2004 | Bannasch | B64C 11/16 416/129 |
| 6,948,910 B2 | * | 9/2005 | Polacsek | F03D 1/0608 416/227 R |
| 11,203,413 B2 | * | 12/2021 | Gold | B64C 11/18 |

(Continued)

FOREIGN PATENT DOCUMENTS

DE 102008057212 A1 * 5/2010 ............ F03B 17/061
DE 102008008060 B4 * 8/2017 .............. B63H 1/16
(Continued)

*Primary Examiner* — Topaz L. Elliott
(74) *Attorney, Agent, or Firm* — Cooper Legal Group LLC; David A. Resser

(57) ABSTRACT

A turbine system includes a shaft extending along an axis. A first spoke has a first end, attached to the shaft, and a second end. A second spoke has a first end, attached to the shaft, and a second end. A third spoke has a first end, attached to the shaft, and a second end. A turbine blade is attached to the second end of the first spoke, the second end of the second spoke, and the second end of the third spoke. The turbine blade extends continuously circumferentially about the axis. The turbine blade is spaced a distance apart from the axis and in non-contact with the shaft.

15 Claims, 13 Drawing Sheets

(56) References Cited

U.S. PATENT DOCUMENTS

| | | | | |
|---|---|---|---|---|
| 2004/0009063 A1* | 1/2004 | Polacsek | ............... | F03D 1/0608 |
| | | | | 416/223 R |
| 2010/0034656 A1* | 2/2010 | Miller | ................... | F03B 17/061 |
| | | | | 416/189 |
| 2017/0267323 A1* | 9/2017 | Sharrow | ................. | B64C 11/20 |

FOREIGN PATENT DOCUMENTS

| | | | | | |
|---|---|---|---|---|---|
| EP | 3249238 | B1 * | 6/2019 | ............... | B04B 5/12 |
| GB | 2507773 | A * | 5/2014 | ............... | B63H 1/14 |

* cited by examiner (Without blue air flow)

(Without blue air flow)

TURBINE BLADE ASSEMBLY

CROSS-REFERENCE TO RELATED APPLICATIONS

This application claims priority to U.S. Patent Application No. 62/593,404, filed on Dec. 1, 2017, and U.S. patent application Ser. No. 16/208,553, filed on Dec. 3, 2018, both entitled "TURBINE BLADE ASSEMBLY," which are both hereby incorporated by reference.

TECHNICAL FIELD

The instant application is directed towards a turbine blade assembly. For example, the instant application is directed towards a turbine blade assembly for a wind turbine system.

BACKGROUND

Wind turbines have been used to convert wind power into energy (e.g., electrical energy). In past applications, turbine blades have rotated in response to the force of the wind power, with the rotation transferred to electrical energy generating equipment.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a turbine system includes a shaft extending along an axis. The turbine system also includes a first spoke having a first end, attached to the shaft, and a second end. The turbine system also includes a second spoke having a first end, attached to the shaft, and a second end. The turbine system further includes a third spoke having a first end, attached to the shaft, and a second end. The turbine system further includes a turbine blade attached to the second end of the first spoke, the second end of the second spoke, and the second end of the third spoke. The turbine blade extending continuously circumferentially about the axis, and the turbine blade is spaced a distance apart from the axis and in non-contact with the shaft.

In an example, a turbine system includes a shaft extending along an axis. The turbine system also includes at least one spoke having a first end, attached to the shaft, and a second end. The turbine system further includes a turbine blade attached to the second end of the at least one spoke, the turbine blade extending continuously circumferentially about the axis. A first portion of the turbine blade is spaced a first distance from the axis, and a second portion of the turbine blade spaced a second distance from the axis that is different than the first distance.

In an example, a turbine system includes a shaft extending along an axis. The turbine system also includes at least one spoke having a first end, attached to the shaft, and a second end. The turbine system further includes a turbine blade attached to the second end of the at least one spoke. The turbine blade extends continuously circumferentially about the axis. The turbine blade includes an outer face oriented away from the axis and an inner face oriented towards the axis. At a first location of the turbine blade, the inner face faces a first direction along the axis and the outer face faces a second direction along the axis. At a second location of the turbine blade, the inner face faces the second direction along the axis and the outer face faces the first direction along the axis.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
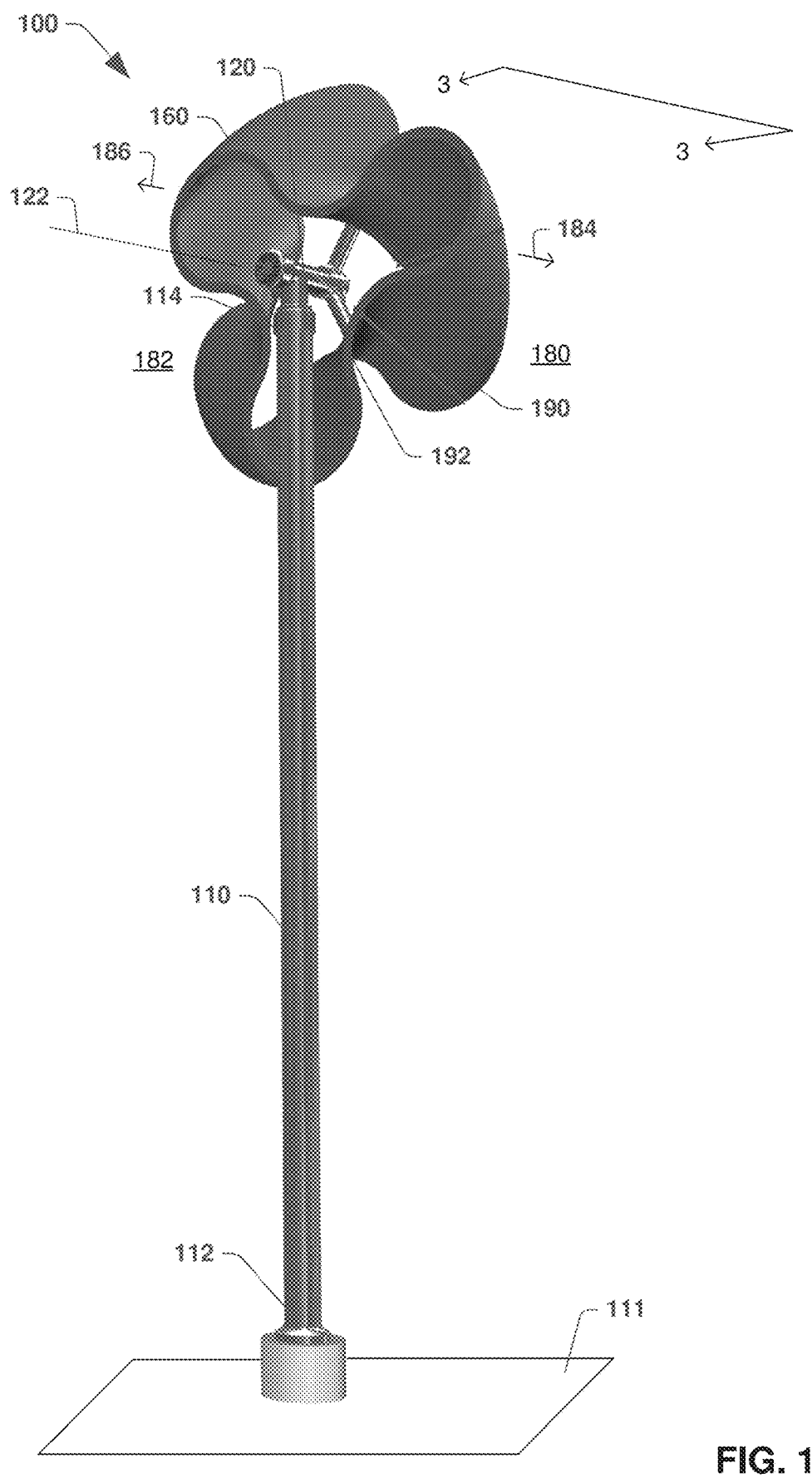
FIG. 1 is an illustration of an example wind turbine system.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, an example of a wind turbine system 100 is illustrated. In an example, the wind turbine system 100 is a rotary mechanical device that can extract energy from a flow of fluid (e.g., air, liquid, etc.,), and convert this flow into electricity. The wind turbine system 100 can be situated in a location that tends to be windy, such that the force of the wind can cause rotation of a turbine, thus generating electricity. In an example, wind can flow along the direction illustrated with arrow 186 thus causing the air flow to enter at a generator end.

The wind turbine system 100 includes a support beam 110. The support beam 110 can be attached to and/or supported upon a surface, such as the ground 111. The support beam 110 can comprise one or more additional structures to assist in securing the support beam 110 with respect to the ground, such as fasteners, concrete, mounting plates, etc. In this example, the support beam 110 can be substantially fixed with respect to the ground so as to be limited from inadvertent movement.

The support beam 110 may comprise any number of materials, though in an example, the support beam 110 may comprise a rigid, non-flexible material. For example, the support beam 110 may comprise a metal material or a metal composite material. In this way, the support beam 110 is limited from inadvertent breaking, fracturing, bending, etc. due to the forces applied upon the wind turbine system 100 by the wind.

The support beam 110 can extend between a first beam end 112 and a second beam end 114. In an example, the first beam end 112 can be fixed with respect to the surface (e.g., the ground) 111, while the second beam end 114 can be located opposite the first beam end 112. In an example, the support beam 110 can extend substantially linearly between the first beam end 112 and the second beam end 114, though, in some examples, the support beam 110 may comprise one or more bends, or angles. The support beam 110 can be at least partially hollow so as to support one or more wires or electrical components within the support beam 110.

The wind turbine system 100 includes a shaft 120. In an example, the shaft 120 can be attached with respect to the second beam end 114 of the support beam 110. For example, the shaft 120 can be attached to the second beam end 114 of the support beam 110 by means of one or more different structures such as bearings, mechanical fasteners, gears, etc. In this way, the shaft 120 can rotate with respect to the support beam 110. In an example, the shaft 120 can extend along an axis 122, with the shaft 120 rotating relative to the axis 122.

As shown in FIG. 1, there are some examples of the wind turbine system where if a circle is drawn around the exterior of the turbine blade, a line from any of the infinite number of points on the circle drawn to the axis of the shaft will pass through the turbine blade.

Figure 2:
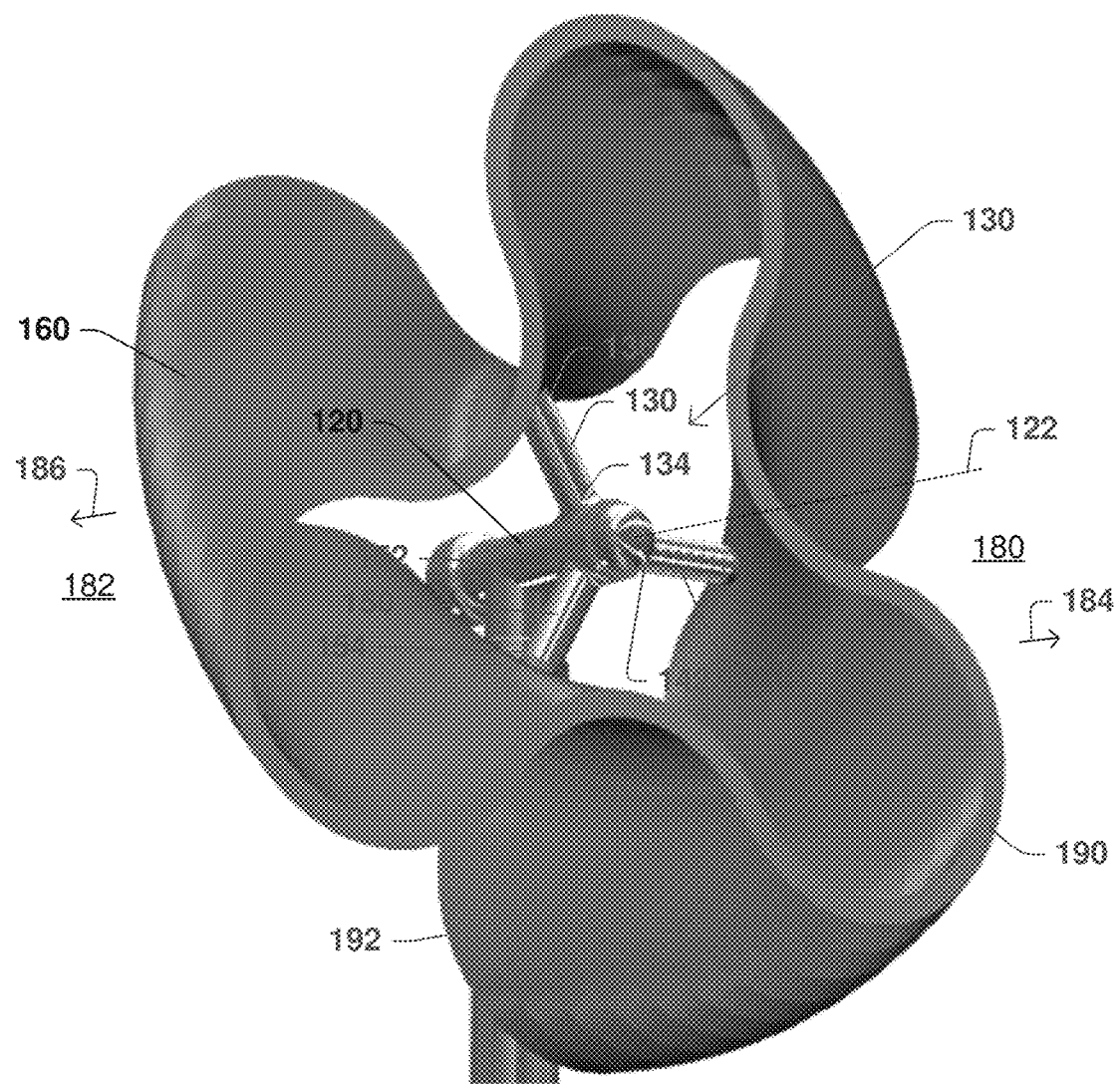
FIG. 2 is an illustration of an example wind turbine system.

Referring to FIG. 2, the wind turbine system 100 includes at least one spoke 130. In an example, the at least one spoke 130 can be attached to the shaft 120 such that rotation of the at least one spoke 130 can cause rotation of the shaft 120. The at least one spoke 130 can extend in a direction that is substantially perpendicular to the shaft 120. The at least one spoke 130 can comprise any number of materials that may be rigid and/or resistive to inadvertent bending or flexing. For example, the at least one spoke 130 may comprise a metal material, metal composite material, etc.

While any number of spokes 130 may be provided, in an example, the wind turbine system 100 includes three spokes: a first spoke 132, a second spoke 140, and a third spoke 150. The first spoke 132 can extend between a first end 134 and a second end 136. In an example, the first end 134 can be attached to the shaft 120. The second spoke 140 can extend between a first end 142 and a second end 144. In an example, the first end 142 can be attached to the shaft 120. The third spoke 150 can extend between a first end 152 and a second end 154. In an example, the first end 152 can be attached to the shaft 120.

In this way, the three spokes 132, 140, 150 can extend outwardly from the shaft 120, such that when the spokes 132, 140, 150 are rotated, the shaft 120 can likewise rotate. In an example, the three spokes 132, 140, 150 may be spaced apart about 120 degrees from each other. That is, the first spoke 132 and the second spoke 140 may be spaced apart about 120 degrees around the shaft 120. The second spoke 140 and the third spoke 150 may also be spaced apart about 120 degrees around the shaft 120. The third spoke 150 and the first spoke 132 may likewise be spaced apart about 120 degrees around the shaft 120.

The wind turbine system 100 includes a turbine blade 160 that can be supported by the spokes 132, 140, 150. In an example, the turbine blade 160 can be attached to the spokes 132, 140, 150 in any number of ways, such as with mechanical fasteners, adhesives or welding, being one piece formed with, etc. The turbine blade 160 can be attached to the second end 136 of the first spoke 132, the second end 144 of the second spoke 140, and the second end 154 of the third spoke 150. In this way, as the wind turbine blade 160 rotates as a result of the wind force, the spokes 132, 140, 150 can likewise rotate with respect to the shaft 120.

The turbine blade 160 can extend continuously circumferentially about the axis 122 defined by the shaft 120. For example, the turbine blade 160 can extend about the axis 122 in an unbroken manner. That is, the turbine blade 160 can define a path around the axis 122 that is devoid of openings, gaps, etc. As will be explained herein, this unbroken, continuous shape of the turbine blade 160 can assist in rotation of the turbine blade 160 as a result of wind force.

In an example, the turbine blade 160 can define a first side 180 (e.g., illustrated in FIG. 1) and a second side 182. In an example, the second beam end 114 of the support beam 110 can be disposed on the second side 182 of the turbine blade 160. The first side 180 can be disposed on an opposite side of the turbine blade 160 from the second side 182. In an example, a front surface 190 of the turbine blade 160 can face a first direction 184 (e.g., facing the first side 180). A rear surface 192 of the turbine blade 160 can face a second direction 186 (e.g., facing the second side 182).

Figure 3:
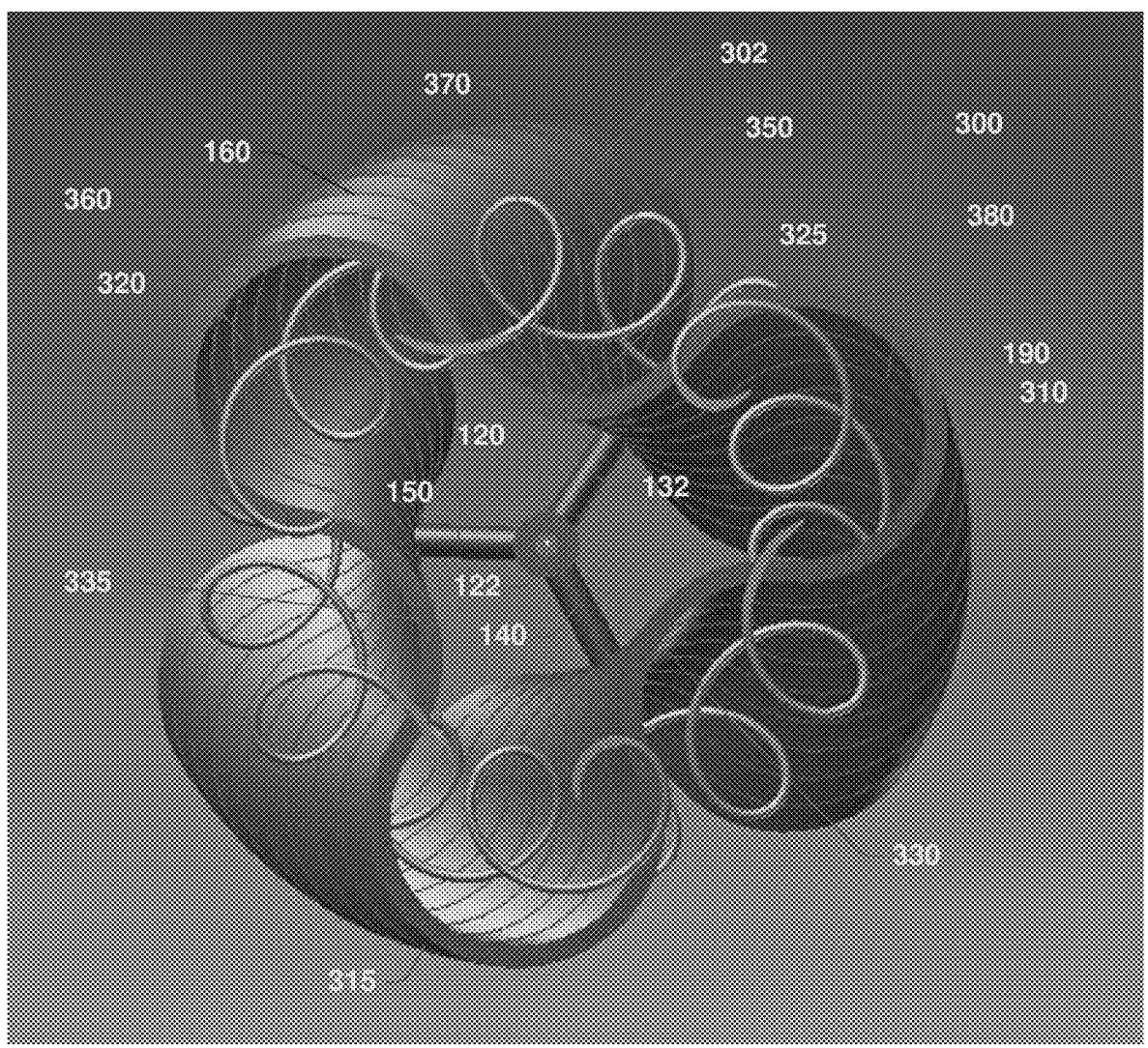
FIG. 3 is an illustration of an example blade assembly of a wind turbine system.
Figure 4:
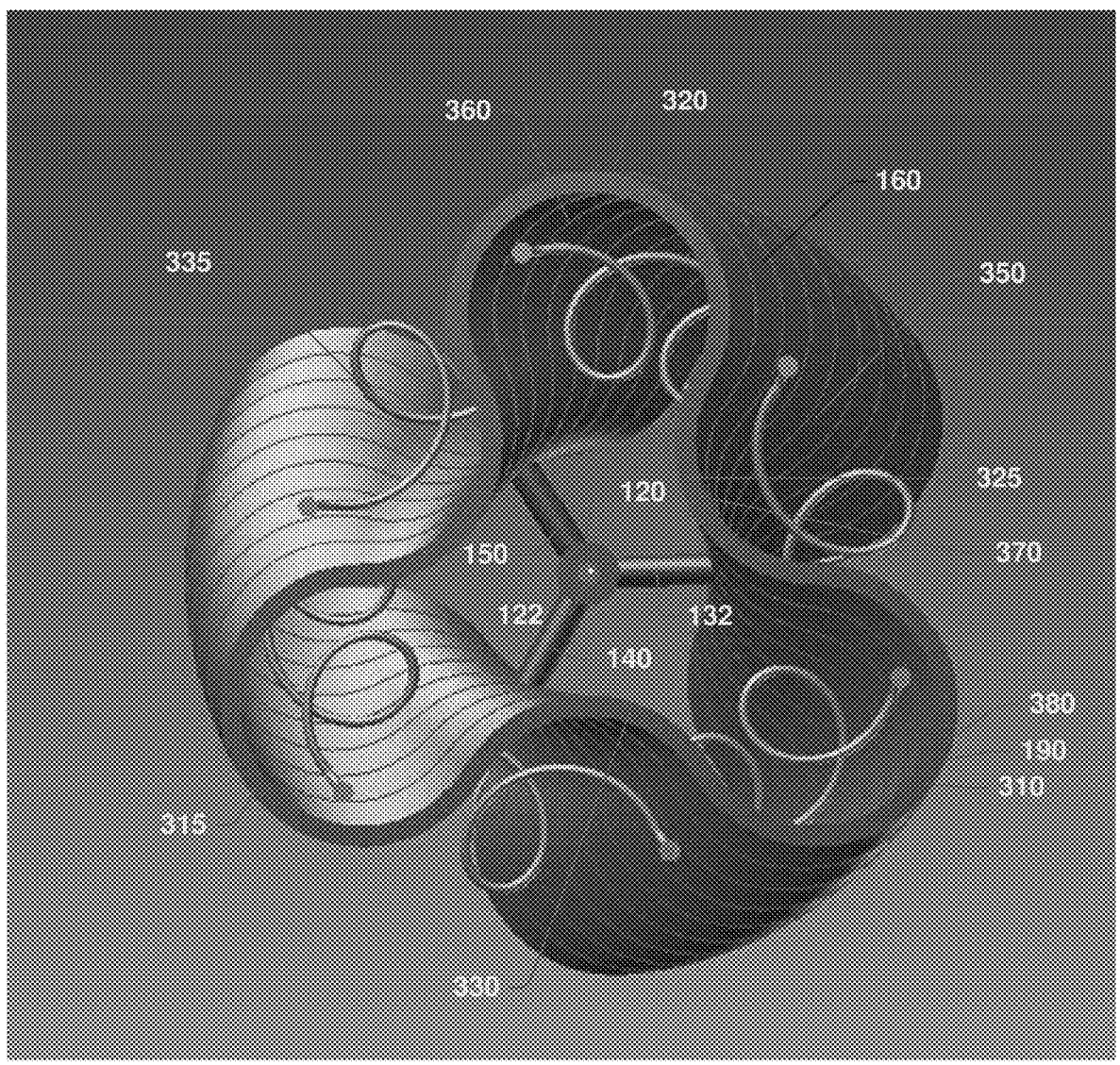
FIG. 4 is an illustration of an example blade assembly of a wind turbine system.

Referring to FIGS. 3 and 4, the front surface 190 of the turbine blade 160 is illustrated as viewed from the perspective indicated by lines 3-3 of FIG. 1. In the illustrated example of FIG. 3, the turbine blade 160 may be in the foreground while the shaft 120 may be in the background. The axis 122 may extend into and out of the page.

In an example, the turbine blade 160 includes an inner face 300 and an outer face 302. The inner face 300 may be oriented to face the axis 122 (e.g., a center of the turbine blade 160). The outer face 302 may be oriented to face away from the axis 122 (e.g., an exterior of the turbine blade 160) opposite the inner face 300. In an example, the inner face 300 and the outer face 302 can extend between the front surface 190 and the rear surface 192 along the axis 122. In an example, the inner face 300 and the outer face 302 may have a dimension (e.g., length) between the front surface 190 and the rear surface 192 (e.g., along the axis 122). In an example, the front surface 190 and the rear surface 192 may have a dimension (e.g., thickness) between the inner face 300 and the outer face 302 (e.g., perpendicular to the axis 122). In an example, the dimension (e.g., length) of the inner face 300 and/or the outer face 302 may be greater than the dimension (e.g., thickness) of the front surface 190 and/or the rear surface 192. That is, a length of the turbine blade 160 along the axis 122 may be greater than a thickness of the turbine blade 160 perpendicular to the axis 122.

The turbine blade 160 can extend continuously circumferentially about the axis 122. It will be appreciated that by extending circumferentially about the axis 122, the turbine blade 160 is not limited to being spaced a constant distance apart from the axis 122 at all locations of the turbine blade 160. Rather, in an example, the turbine blade 160 may extend circumferentially about the axis 122 while being spaced a non-constant distance from the axis 122.

The turbine blade 160 can be spaced different distances from the axis 122 at different locations. For example, the turbine blade 160 may comprise one or more peaks and/or valleys that define a maximum and a minimum distance from the axis 122. In an example, the turbine blade 160 includes a first peak 310, a second peak 315, and a third peak 320. The first peak 310 may be disposed between the first spoke 132 and the second spoke 140. The first peak 310 may be spaced a maximum distance apart from the axis 122. The second peak 315 may be disposed between the second spoke 140 and the third spoke 150. The second peak 315 may be spaced a maximum distance apart from the axis 122, such that the second peak 315 may be spaced the same distance from the axis 122 as the first peak 310. In an example, the second peak 315 and the first peak 310 may be spaced apart between about 100 degrees and about 140 degrees, or about 120 degrees.

The third peak 320 may be disposed between the third spoke 150 and the first spoke 132. The third peak 320 may be spaced a maximum distance apart from the axis 122, such that the third peak 320 may be spaced the same distance from the axis 122 as the first peak 310 and/or the second peak 315. In an example, the third peak 320 may be spaced apart from the first peak 310 and/or the second peak 315 between about 100 degrees and about 140 degrees, or about 120 degrees.

The turbine blade 160 may comprise one or more valleys that define a minimum distance from the axis 122. In an example, the turbine blade 160 includes a first valley 325, a second valley 330, and a third valley 335. The first valley 325 may be disposed adjacent to the first spoke 132. That is, in an example, an axis along which the first spoke 132 extends may intersect the first valley 325. The first valley 325 may be spaced a minimum distance apart from the axis 122. The second valley 330 may be disposed adjacent to the second spoke 140. That is, in an example, an axis along which the second spoke 140 extends may intersect the second valley 330. The second valley 330 may be spaced a minimum distance apart from the axis 122. The third valley 335 may be disposed adjacent to the third spoke 150. That is, in an example, an axis along which the third spoke 150 extends may intersect the third valley 335. The third valley 335 may be spaced a minimum distance apart from the axis 122.

In an example, the peaks and the valleys may alternate about the axis 122. For example, the first valley 325 may be bordered by the first peak 310 and the third peak 320. The second valley 330 may be bordered by the first peak 310 and the second peak 315. The third valley 335 may be bordered by the second peak 315 and the third peak 320. As such, in an example, the peaks and valleys may alternate in the following order about the axis 122: first valley 325, first peak 310, second valley 330, second peak 315, third valley 335, and third peak 320.

In addition to extending circumferentially about the axis 122 while being spaced a non-constant distance from the axis 122, the faces of the turbine blade 160 (e.g., inner face 300 and outer face 302) can alternate directions towards which they face. For example, at some locations, the inner face 300 of the turbine blade 160 may face towards the first side 180 while the outer face 302 of the turbine blade 160 may face towards the second side 182. At other locations, the inner face 300 may face towards the second side 182 while the outer face 302 may face towards the first side 180.

In an example, the turbine blade 160 can have a first location 350. At the first location 350, the outer face 302 can face towards the first side 180 (e.g., out of the page) while the inner face 300 can face towards the second side 182 (e.g., into the page). In an example, an axis extending from the first side 180 towards the second side 182 (e.g., into the page) can intersect the outer face 302 first before intersecting the inner face 300. The turbine blade 160 can have a second location 360. At the second location 360, the inner face 300 can face towards the first side 180 (e.g., out of the page) while the outer face 302 can face towards the second side 182 (e.g., into the page). In an example, an axis extending from the first side 180 towards the second side 182 (e.g., into the page) can intersect the inner face 300 first before intersecting the outer face 302.

The turbine blade 160 can have a third location 370 and a fourth location 380. At the third location 370 and the fourth location 380, the inner face 300 and the outer face 302 may be oriented so as not to face the first side 180 or the second side 182. Rather, the inner face 300 can face inwardly towards the axis 122 while the outer face 302 can face outwardly away from the axis 122.

It will be appreciated that the turbine blade 160 can alternate orientations towards which the inner face 300 and the outer face 302 face. For example, between the peaks (e.g., 310, 315, 320) and the valleys (e.g., 325, 330, 335), the inner face 300 may face the first side 180 while the outer face 302 may face the second side 182 (or vice versa). In this way, as air flows from the first side 180 towards the second side 182 along the axis 122 (e.g., into the page), the air flow can contact either the inner face 300 or the outer face 302.

Figure 5:
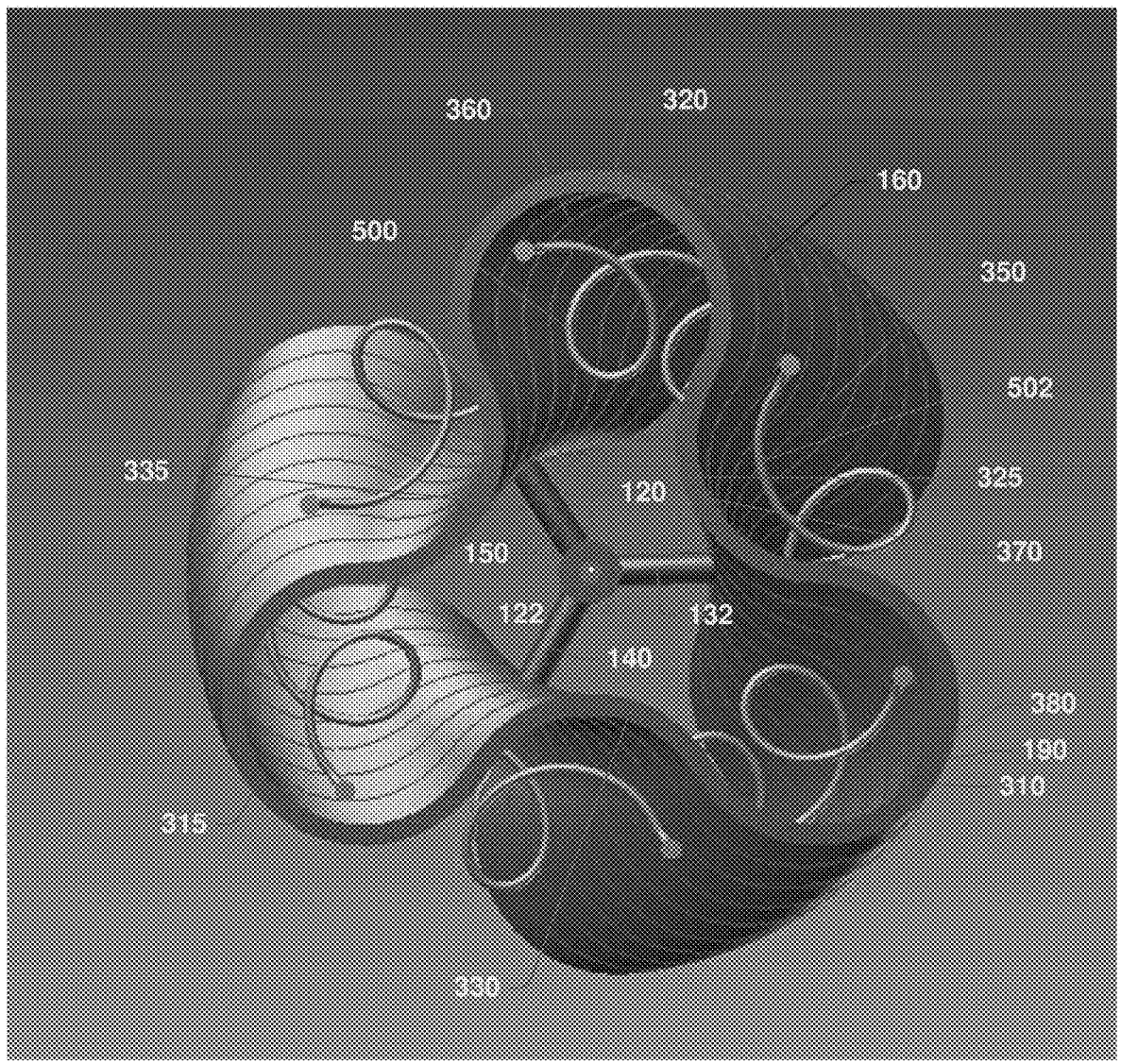
FIG. 5 is an illustration of an example blade assembly and air flow.

Referring to FIG. 5, the turbine blade 160 is illustrated along with an example air flow 500, 502. In an example, an air flow 500 can move from the first side 180 towards the second side 182 (e.g., into the page). The shape of the turbine blade 160 provides a number of benefits with respect to the air flow 500. For example, at the second location 360, the air 500 can first contact and/or engage the inner face 300 of the turbine blade 160. Due to the inner face 300 facing the first side 180 and extending non-parallel to the axis 122, the inner face 300 can cause the air flow 500 to move in a turbulent, non-linear manner. As illustrated, the air flow 500 can move circularly while contacting the inner face 300 while moving from the first side 180 towards the second side 182. This turbulent motion of the air flow 500 can generate rotation of the turbine blade 160 about the axis 122.

In an example, a second air flow 502 can move from the first side 180 towards the second side 182 (e.g., into the page). The shape of the turbine blade 160 provides a number of benefits with respect to the second air flow 502. For example, at the first location 350, the air 502 can first contact and/or engage the outer face 302 of the turbine blade 160. Due to the outer face 300 facing the first side 180 and extending non-parallel to the axis 122, the outer face 302 can cause the air flow 502 to move in a turbulent, non-linear manner. As illustrated, the air flow 502 can move circularly while contacting the outer face 302 while moving from the first side 180 towards the second side 182. This turbulent motion of the air flow 502 can generate rotation of the turbine blade 160 about the axis 122.

Figure 6:
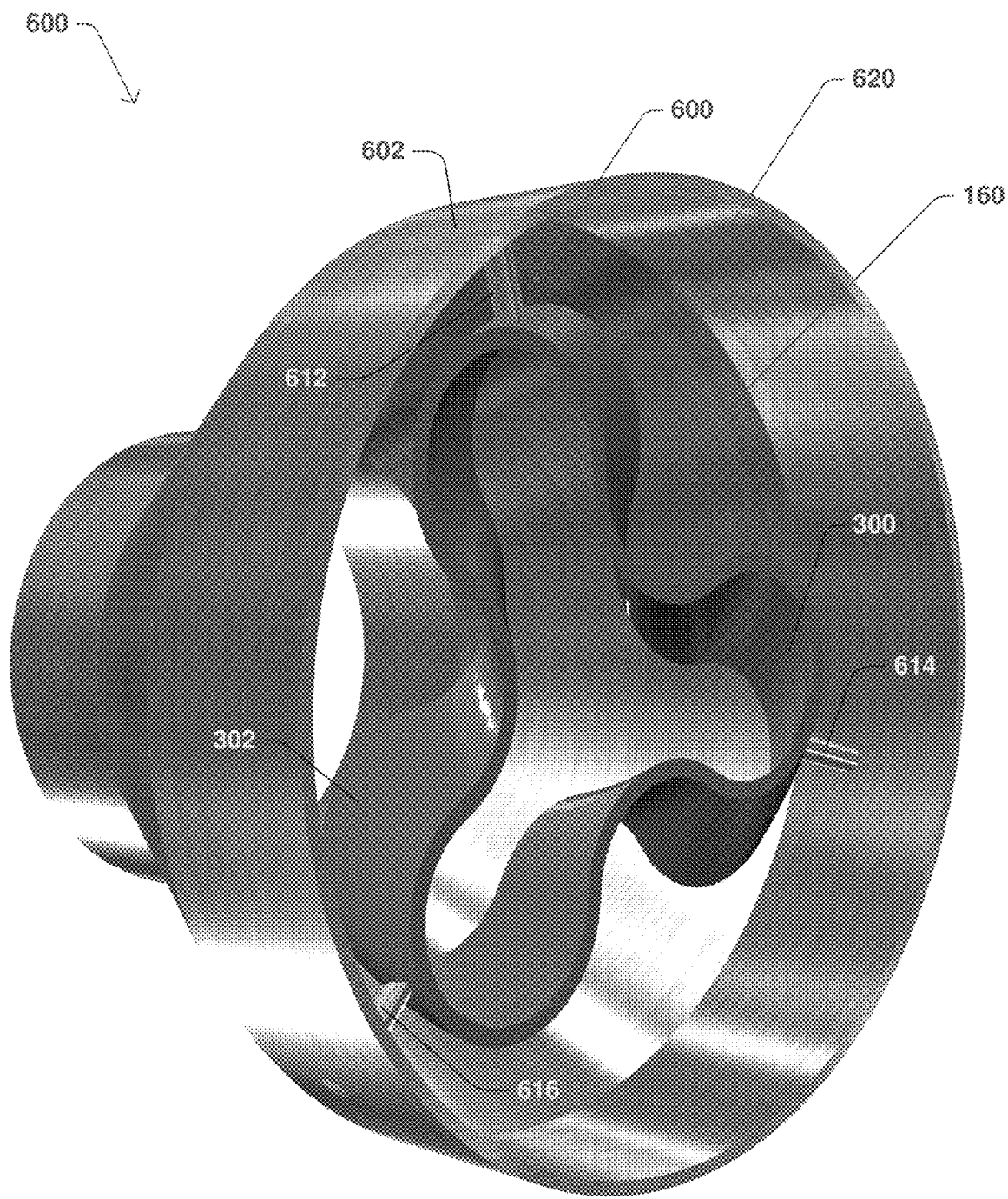
FIG. 6 is an illustration of an example turbine system.

Referring to FIG. 6, another example of a turbine system 600 having the turbine blade 160 is illustrated. In an example, the turbine blade 160 is substantially similar and/or identical to the turbine blade 160 illustrated and described with respect to FIGS. 1 to 5. However, in this example, the turbine blade 160 may not comprise the shaft 120 extending along the axis 122, the first spoke 132, the second spoke, 140, and/or the third spoke 150. Rather, a center area of the turbine blade 160 (e.g., within the inner face 300) may be substantially hollow.

In an example, instead of comprising the spokes, the turbine system 600 may comprise an outer cylinder 602 to which the turbine blade 160 is attached. For example, the outer face 302 of the turbine blade 160 may be attached to the outer cylinder 602 with one or more outer spokes 610. In an example, the one or more outer spokes 610 may comprise a first outer spoke 612, a second outer spoke 614, and/or a third outer spoke 616. The first outer spoke 612 may be attached to the outer face of the first peak 310, the second outer spoke 614 may be attached to the outer face of the second peak 315, and the third outer spoke 616 may be attached to the outer face of the third peak 320.

The first outer spoke 612, the second outer spoke 614, and the third outer spoke 616 may extend between the outer face 302 of the turbine blade 160 and an inner surface 620 of the outer cylinder 602. In this way, the first outer spoke 612, the second outer spoke 614, and the third outer spoke 616 can be attached to the inner surface 620 of the outer cylinder 602. In this example, the turbine system 600 may or may not be rotated. When not rotated, the outer cylinder 602 and, thus, the turbine blade 160, may stay stationary, such that air and/or fluid flow through the outer cylinder 602 may be enhanced.

Figure 7:
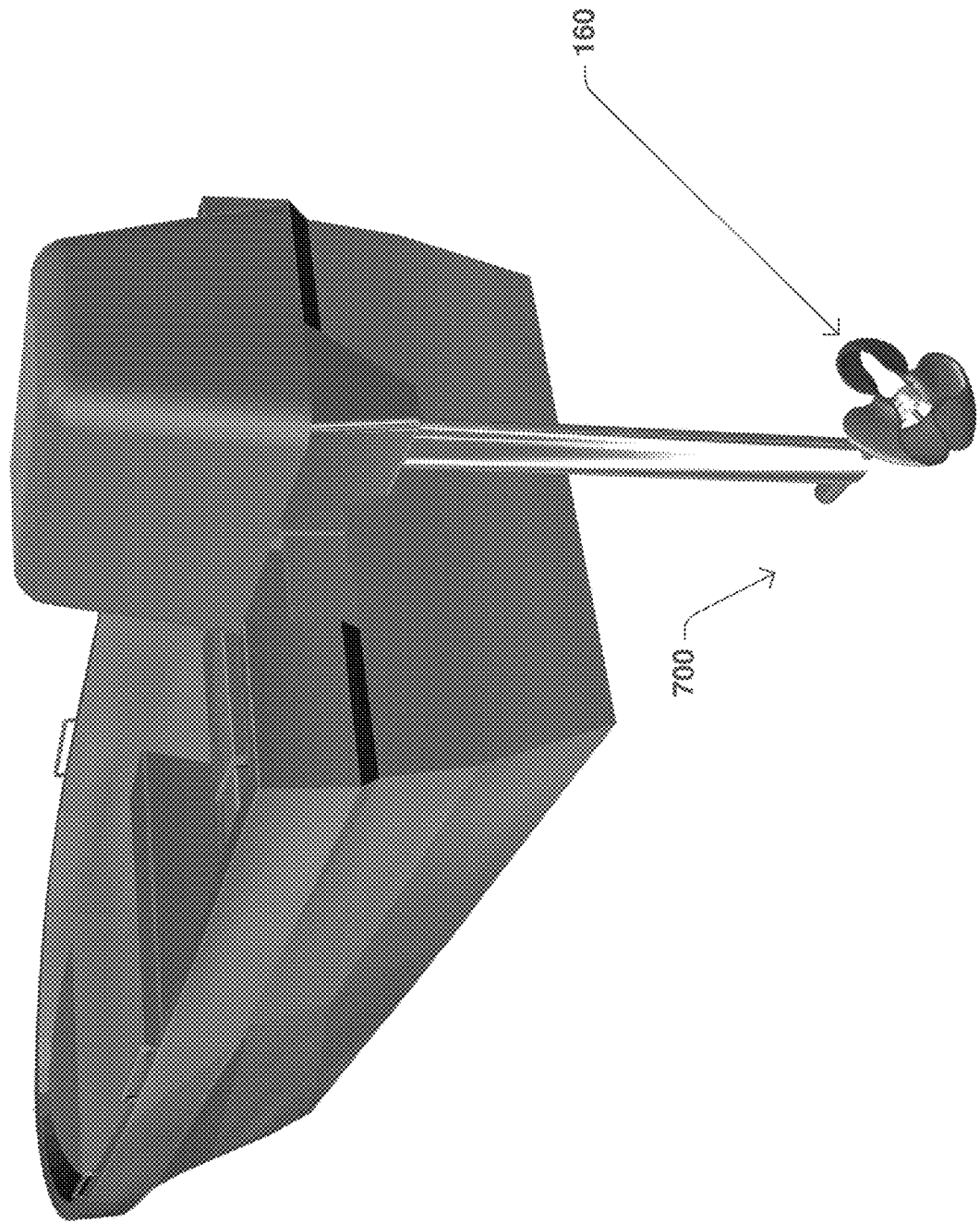
FIG. 7 is an illustration of an example turbine system.

Referring to FIG. 7, another example of a turbine system 700 having the turbine blade 160 is illustrated. In an example, the turbine blade 160 is substantially similar and/or identical to the turbine blade 160 illustrated and described with respect to FIGS. 1 to 5. For example, the turbine blade 160 may be attached to the shaft 120 by one or more of the at least one spoke 130 (e.g., the first spoke 132, the second spoke 140, and the third spoke 150). The turbine system 700 can be used as part of a boat motor, so as to propel a boat through water. In this way, the turbine blade 160 can be rotated (e.g., with a motor or other similar apparatus), with the rotation causing water to be forced through the turbine blade 160, thus generating a propulsion force.

Figure 8:
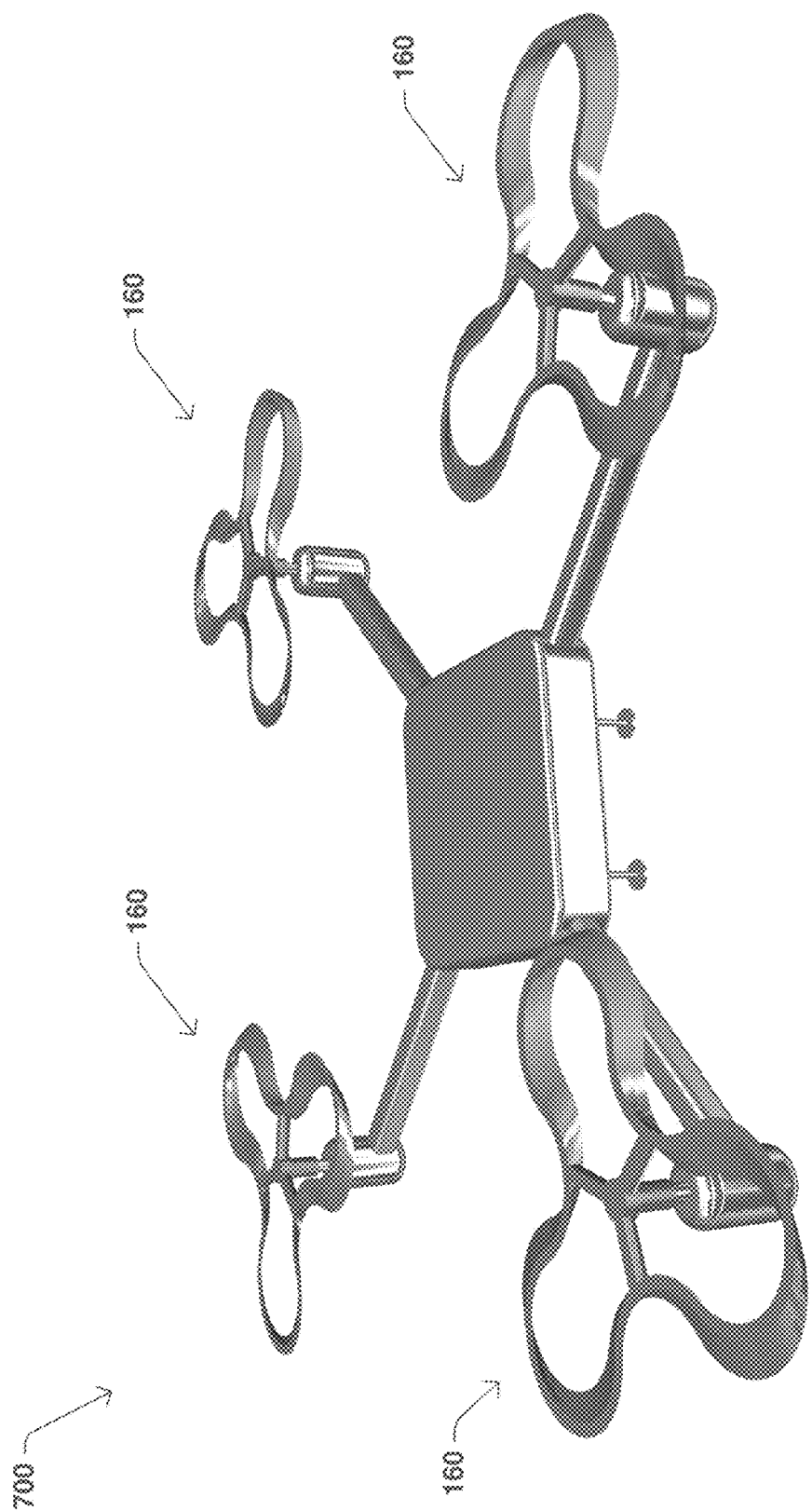
FIG. 8 is an illustration of an example turbine system.

Referring to FIG. 8, another example of a turbine system 800 having the turbine blade 160 is illustrated. In this example, the turbine system 800 includes four turbine blades 160, though any number (e.g., one or more) may be provided. The turbine blades 160 can be substantially similar and/or identical to the turbine blade 160 illustrated and described with respect to FIGS. 1 to 5. For example, the turbine blade 160 may be attached to a shaft (e.g., 120) by one or more spokes (e.g., 130). In this example, the turbine system 800 can be used as part of an aerial vehicle (e.g., manned or unmanned aerial vehicle), such as a drone. As such, the turbine blades 160 can be rotated (e.g., with a motor or other similar apparatus), with the rotation causing air to be forced through the turbine blade 160, thus generating a propulsion force.

Figure 9:
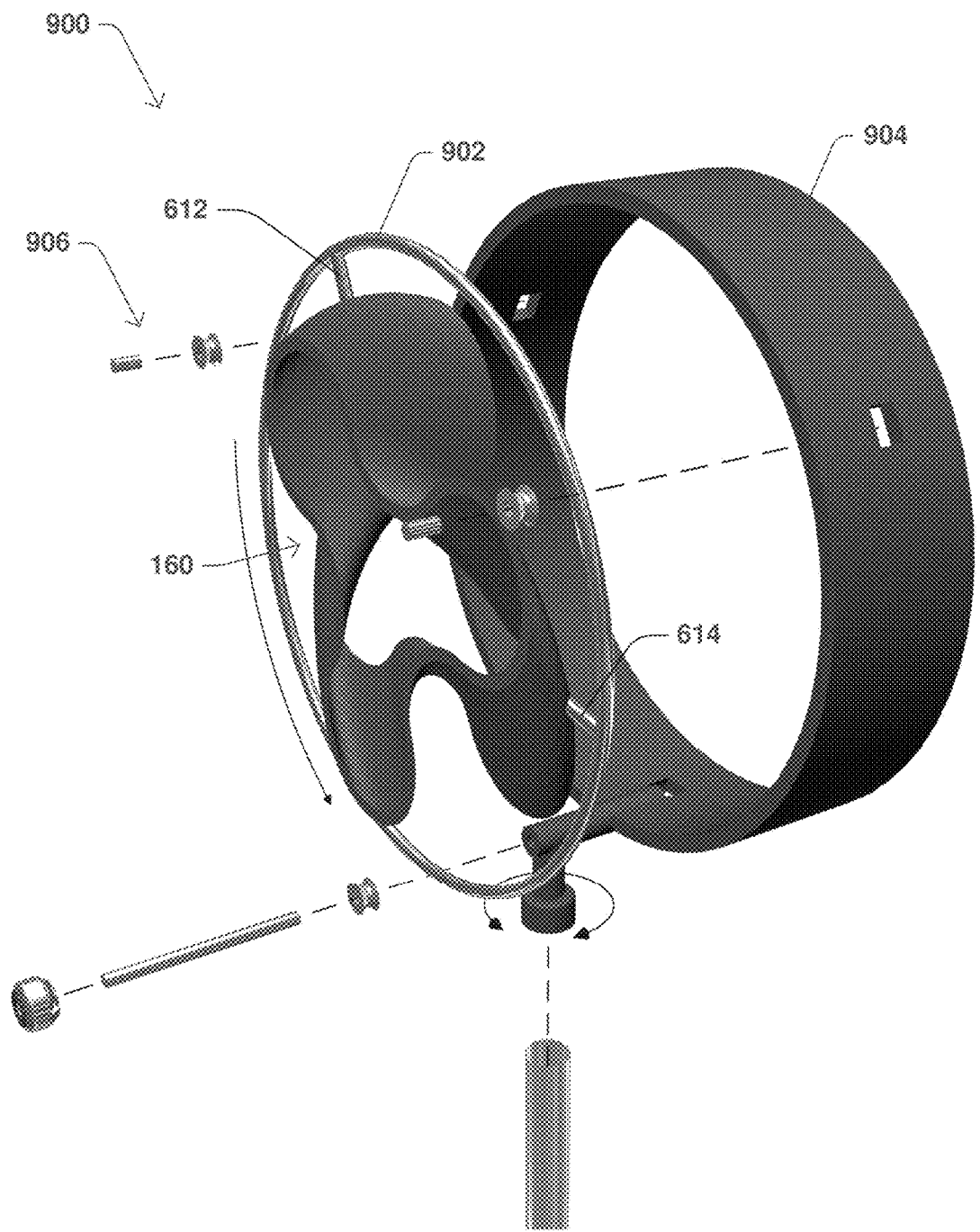
FIG. 9 is an illustration of an example turbine system.
Figure 10:
FIG. 10 is an illustration of an example turbine system.
Figure 11:
FIG. 11 is an illustration of an example turbine system.

Referring to FIGS. 9 to 11, another example of a turbine system 900 having the turbine blade 160 is illustrated. In an example, the turbine blade 160 is substantially similar and/or identical to the turbine blade 160 illustrated and described with respect to FIGS. 1 to 5. In an example, the turbine blade 160 may be attached to a first outer rail 902. The turbine blade 160 can be attached to the first outer rail 902 in any number of ways, such as with the first outer spoke 612, the second outer spoke 614, and/or the third outer spoke 616. It will be appreciated that the third outer spoke 616 is obstructed from view in FIG. 9, but is illustrated in FIG. 11. The first outer rail 902 can extend circumferentially around the turbine blade 160.

The first outer rail 902 can be rotatably attached to a second outer rail 904. For example, one or more attachment structures (e.g., rollers, fasteners, etc.) can be disposed radially between the first outer rail 902 and the second outer rail 904. In this way, the first outer rail 902 can rotate relative to the second outer rail 904. The second outer rail 904 can have a larger circumferential size than the first outer rail 902, such that the second outer rail 904 can surround the first outer rail 902. In this way, the turbine blade 160 can be received within the first outer rail 902, while the first outer rail 902 can be received within the second outer rail 904. As a result, the turbine blade 160 can be rotated (e.g., with a motor or other similar apparatus), with the rotation causing air to be forced through the turbine blade 160. Together, the turbine blade 160 and the first outer rail 902 can rotate relative to the second outer rail 904, with the rotation causing a fan-like effect. Accordingly, the turbine system 900 can be implemented as part of a fan apparatus.

Figure 12:
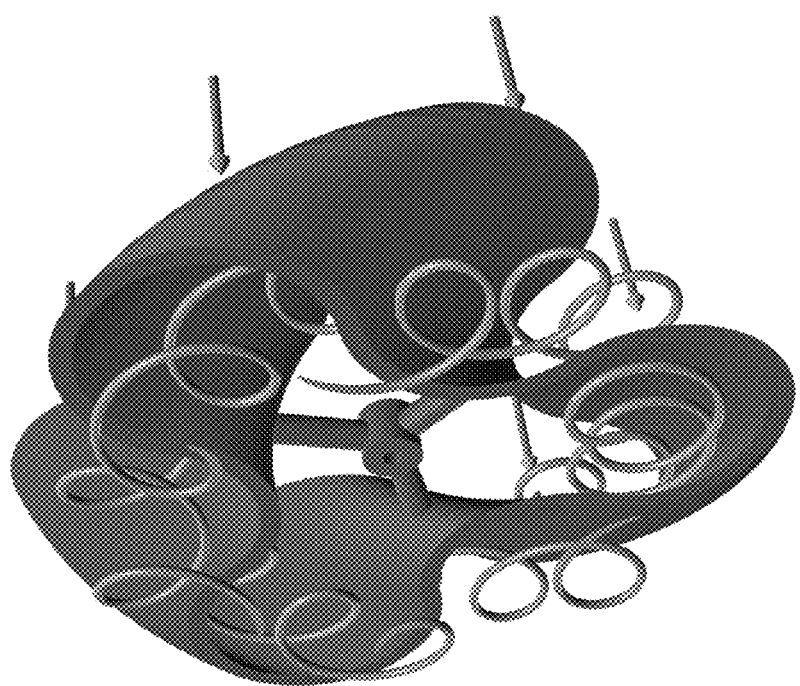
FIG. 12 is an illustration of an example turbine with vortex paths.

Referring to FIG. 12, a representation of the vortex path between each of the peaks is shown. The direction of rotation of each vortex is adjacent a vortex having a direction of rotation in the opposite direction. As such, each of the six exiting vortexes create less turbulence by the counter rotations of their adjacent vortexes than many known designs.

Figure 13:
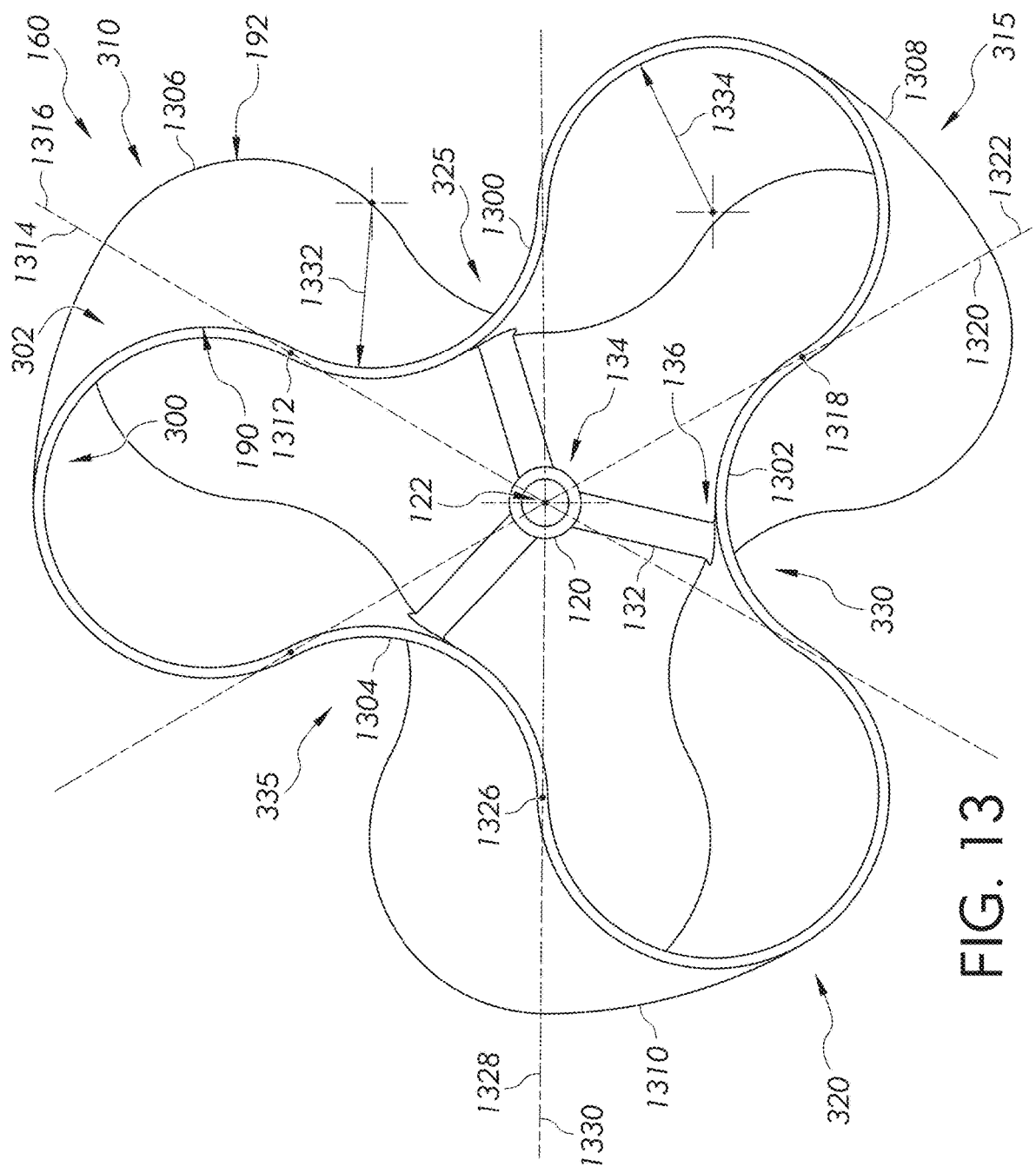
FIG. 13 is an illustration of an example turbine system.

Referring to FIG. 13, an orthographic front view of an example turbine blade is illustrated. In some examples, the turbine blade 160 includes an inner face 300 and an outer face 302. The inner face 300 may be oriented to face the axis 122 (e.g., a center of the turbine blade 160). The outer face 302 may be oriented to face away from the axis 122 (e.g., an exterior of the turbine blade 160) opposite the inner face 300. In an example, the inner face 300 and the outer face 302 can extend between the front surface 190 and the rear surface 192 along the axis 122. In an example, the inner face 300 and the outer face 302 may have a dimension (e.g., length) between the front surface 190 and the rear surface 192 (e.g., along the axis 122). In an example, the front surface 190 and the rear surface 192 may have a dimension (e.g., thickness) between the inner face 300 and the outer face 302 (e.g., perpendicular to the axis 122). In an example, the dimension (e.g., length) of the inner face 300 and/or the outer face 302 may be greater than the dimension (e.g., thickness) of the front surface 190 and/or the rear surface 192. That is, a length of the turbine blade 160 along the axis 122 may be greater than a thickness of the turbine blade 160 perpendicular to the axis 122.

The turbine blade 160 can be attached to a shaft 120 that extends along an axis 122, which, in FIG. 13 would extend into and out of the figure. The turbine blade 160 is attached to the shaft 120 through at least one spoke 132. The spoke 132 has a first end 134 that is attached to the shaft 120. The spoke 132 also has a second end 136 that is attached to the turbine blade 160. As previously described, the turbine blade 160 extends continuously circumferentially about the axis 122. The turbine blade 160 is spaced a distance apart from the axis 122 and the turbine blade 160 does not directly contact the shaft 120.

The turbine blade 160 includes a first valley 325 defined by a first valley curve 1300, a second valley 330 defined by a second valley curve 1302, and a third valley 335 defined by a third valley curve 1304. The turbine blade 160 also includes a first peak 310 defined by a first peak curve 1306, a second peak 315 defined by a second peak curve 1308, and a third peak 320 defined by a third peak curve 1310. Each of the first peak 310, the second peak 315, and the third peak 320 are bordered by at least one of the first valley 325, the second valley 330, and the third valley 335.

The first peak curve 1306 is tangent to the first valley curve 1300 at a point of inflection 1312 and along a first line of tangency 1314 that is oriented in a radial direction as denoted by line 1316. Similarly, the second peak curve 1308 is tangent to the second valley curve 1302 at a point of inflection 1318 and along a second line of tangency 1320 that is oriented in a radial direction as denoted by line 1322. The third peak curve 1310 is tangent to the third valley curve 1304 at a point of inflection 1326 and along a third line of tangency 1328 that is oriented in a radial direction as denoted by line 1330.

Additionally, a radius 1332 of the first valley curve 1300 is equal to the radius 1334 of the first peak curve 1306. In some examples, each of the first valley curve 1300, the second valley curve 1302 and the third valley curve 1304 have equal radii. In some examples, each of the first peak curve 1306, the second peak curve 1308, and the third peak curve 1310 have equal radii.

The presently described apparatus and systems can have several advantages compared to known systems. For example, the counter rotations of the vortex paths of the fluid (e.g., air in a wind gust) passing through the turbine blade can reduce turbulence. In another example, the presently described apparatus can provide greater surface area upon which a fluid (e.g., air in a wind gust) can act to propel the turbine in a rotational direction.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A turbine system comprising:
   a shaft extending along an axis;
   a first spoke having a first end, attached to the shaft, and a second end;
   a second spoke having a first end, attached to the shaft, and a second end;
   a third spoke having a first end, attached to the shaft, and a second end;
   a turbine blade attached to the second end of the first spoke, the second end of the second spoke, and the second end of the third spoke, the turbine blade extending continuously circumferentially about the axis, the turbine blade spaced a distance apart from the axis and in non-contact with the shaft, the turbine blade comprising:
      a first valley defined by a first valley curve;
      a second valley defined by a second valley curve;
      a third valley defined by a third valley curve;
      a first peak defined by a first peak curve;
      a second peak defined by a second peak curve; and
      a third peak defined by a third peak curve, wherein each of the first peak, the second peak, and the third peak are bordered by at least one of the first valley, the second valley, and the third valley,
   wherein:
   the first peak curve is tangent to the first valley curve at a point of inflection and along a first line of tangency that is oriented in a radial direction,
   the second peak curve is tangent to the second valley curve at a point of inflection and along a second line of tangency that is oriented in a radial direction, and
   the third peak curve is tangent to the third valley curve at a point of inflection and along a third line of tangency that is oriented in a radial direction.

2. The turbine system of claim 1, wherein a length of the turbine blade along the axis is greater than a thickness of the turbine blade perpendicular to the axis.

3. The turbine system of claim 1, wherein the turbine blade extends circumferentially about the axis while being spaced a non-constant distance from the axis.

4. The turbine system of claim 1, wherein:
   the first peak is disposed between the first spoke and the second spoke;
   the second peak disposed between the second spoke and the third spoke; and
   the third peak disposed between the third spoke and the first spoke, wherein the first peak, the second peak, and the third peak are spaced around a circumference of the shaft.

5. The turbine system of claim 4, wherein the first peak and the second peak are spaced apart by between 100 degrees and 140 degrees.

6. The turbine system of claim 5, wherein the first peak and the second peak are spaced apart by about 120 degrees.

7. The turbine system of claim 1, wherein the turbine blade further comprises an inner face and an outer face, and the inner face and the outer face alternate the directions in which they face.

8. The turbine system of claim 7, wherein the turbine blade further comprises a first side and a second side, wherein the inner face faces toward the first side and the outer face faces the second side at a first location on the turbine blade, and the inner face faces toward the second side and the outer face faces the first side at a second location on the turbine blade.

9. The turbine system of claim 8, wherein the inner face is oriented to face toward the axis while the outer face is oriented to face away from the axis.

10. The turbine system of claim 1 wherein:
at least one of the first valley, the second valley, and the third valley defines a fluid path oriented at an oblique angle to the axis, wherein:
the fluid path is defined by an inner face impinged by a wind force and an outer face not impinged by the wind force, the inner face and the outer face joined by at least one of a peak or a valley, the wind force passing along the at least one of the peak or the valley imparting a helical rotation to the wind force,
each fluid path having the helical rotation in a first rotational direction that is opposite a second rotational direction in a first adjoining fluid path on a first side of the fluid path and opposite a third rotational direction in a second adjoining fluid path on a second side of the fluid path.

11. The turbine system of claim 1, the turbine blade comprising:
an outer face oriented away from the axis; and
an inner face oriented towards the axis;
wherein at a first location of the turbine blade, the inner face faces a first direction along the axis and the outer face faces a second direction along the axis, and at a second location of the turbine blade, the inner face faces the second direction along the axis, and the outer face faces the first direction along the axis.

12. The turbine system of claim 1, wherein a radius of the first peak curve is equal to a radius of the first valley curve.

13. The turbine system of claim 1, wherein a radius of the first peak curve is equal to a radius of the second peak curve.

14. The turbine system of claim 1, wherein:
a radius of the first peak curve is equal to a radius of the second peak curve,
a radius of the first valley curve is equal to a radius of the second valley curve, and
the radius of the first peak curve is equal to the radius of the first valley curve.

15. A turbine system comprising:
a shaft extending along an axis;
at least one spoke having a first end, attached to the shaft, and a second end; and
a turbine blade attached to the second end of the at least one spoke, the turbine blade extending continuously circumferentially about the axis, the turbine blade spaced a distance apart from the axis and in non-contact with the shaft, the turbine blade comprising:
a first valley defined by a first valley curve;
a second valley defined by a second valley curve;
a third valley defined by a third valley curve;
a first peak defined by a first peak curve;
a second peak defined by a second peak curve; and
a third peak defined by a third peak curve, wherein each of the first peak, the second peak, and the third peak are bordered by at least one of the first valley, the second valley, and the third valley,
wherein:
the first peak curve is tangent to the first valley curve at a point of inflection and along a first line of tangency that is oriented in a radial direction,
the second peak curve is tangent to the second valley curve at a point of inflection and along a second line of tangency that is oriented in a radial direction, and
the third peak curve is tangent to the third valley curve at a point of inflection and along a third line of tangency that is oriented in a radial direction.

* * * * *